E. R. WOLCOTT.
PROCESS AND APPARATUS FOR SEPARATION OF SUSPENDED MATERIAL FROM GASES.
APPLICATION FILED JUNE 30, 1919.
1,416,769.
Patented May 23, 1922.
2 SHEETS—SHEET 2.
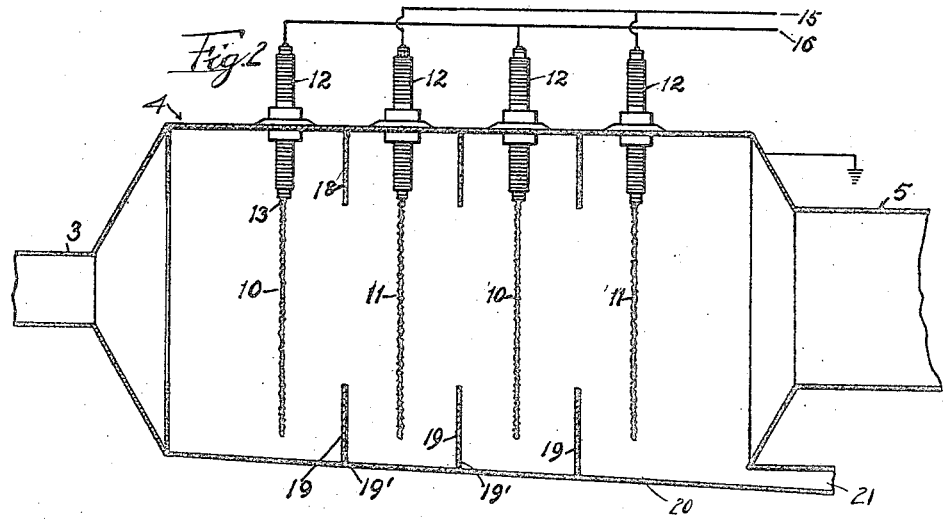
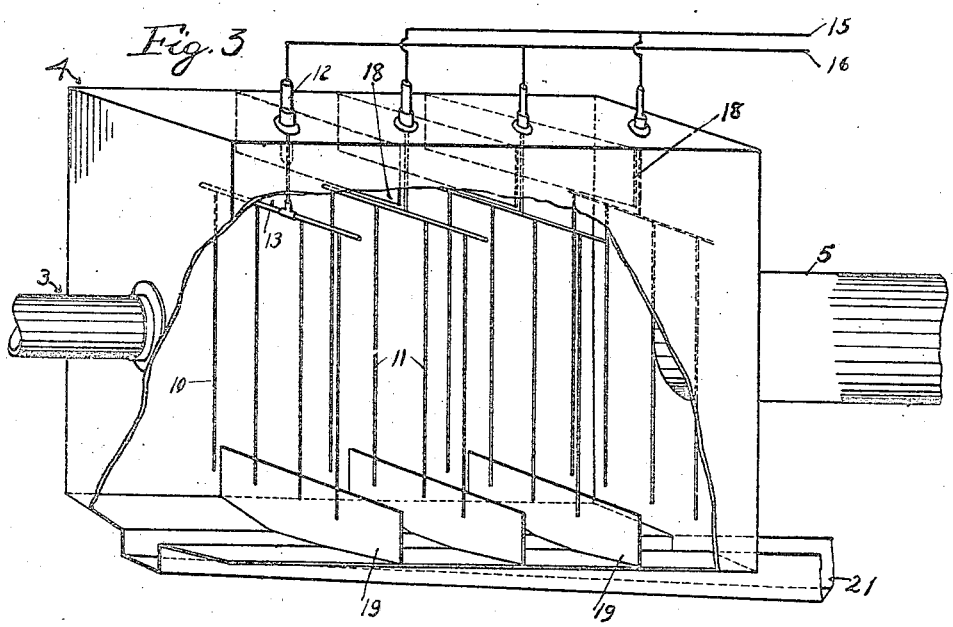
INVENTOR
Edson R. Wolcott
BY
Arthur P. Knight
ATTORNEY

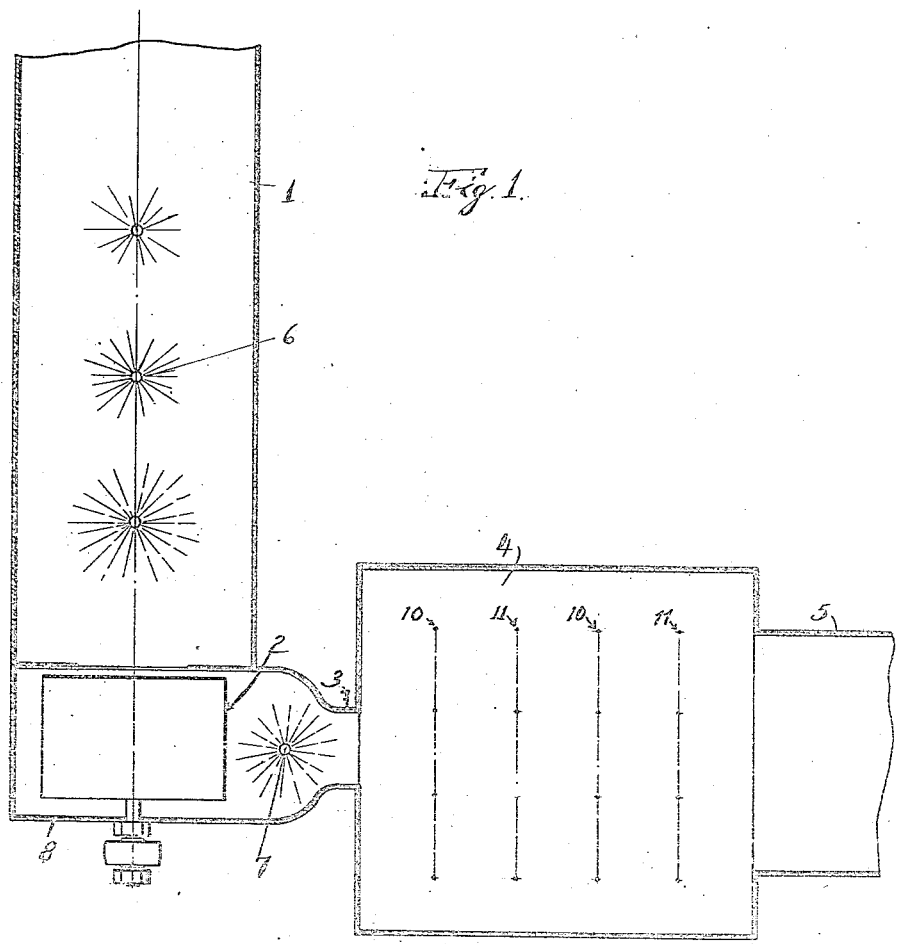

UNITED STATES PATENT OFFICE.

EDSON R. WOLCOTT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS AND APPARATUS FOR SEPARATION OF SUSPENDED MATERIAL FROM GASES.

1,416,769.	Specification of Letters Patent.	Patented May 23, 1922.

Application filed June 30, 1919. Serial No. 307,611.

*To all whom it may concern:*

Be it known that I, EDSON R. WOLCOTT, a citizen of the United States, residing at Los Angeles, in the county of Los Angeles and State of California, have invented a new and useful Process and Apparatus for Separation of Suspended Material from Gases, of which the following is a specification.

This invention relates to the separation of solid suspended material or particles from gases, for example, hot furnace gases from cement kilns, metallurgical smelters or other furnaces in which solid particles are carried by the effluent gases, and the main object of the present invention is to provide a simple and effective process and apparatus for the separation of such particles from the gases at minimum cost of plant installation and operation.

My invention is based primarily on the fact that solid particles when sufficiently wetted can be caused to cohere if brought into contact and that such contact of the particles can be effected by means of an electric field. It has heretofore been proposed to separate suspended particles from gases by wetting the same in spraying or washing operations but such operations have been, in many cases, too slow and inefficient for successful use; on the other hand, it has been found that while dry particles can be brought into contact or proximity by attractive action induced or set up by electric field, effective agglomeration does not necessarily result, particularly if the particles are of a dry nature. I have found that by suitably wetting the particles in the manner hereinafter set forth and then subjecting the particles to the action of an electric field, that agglomeration and separation of the particles from the gases can be successfully carried out.

The accompanying drawings illustrate an apparatus suitable for carrying out my invention, and referring thereto:

Fig. 1 is a horizontal section of such an apparatus;

Fig. 2 is a vertical section of an electrical precipitator suitable for use in connection with such an apparatus;

Fig. 3 is a perspective view of such an electrical precipitator, part of the enclosing casing being broken away.

Referring to Fig. 1, a flue or conduit 1 for conveying or conducting hot furnace gases carrying suspended material is connected at one end to a furnace or source of such gas, not shown, and at the other end to suitable blower means 2, which communicates through a contracted opening 3 with a chamber or casing 4 having an outlet 5 leading to suitable means, such as a stack, for receiving cleaned gas, said outlet 5 being preferably formed as a chamber or flue of sufficient cross-sectional dimensions to act as a settling chamber, if required. In the inlet flue or conduit 1 are provided suitable means for spraying, injecting or distributing water into the gases to humidify or wholly or partially saturate the same, as may be required and suitable spraying or water injecting means 7 may also be provided in the connection between the casing 8 of the blower 2 and the constricted opening 3 leading to the precipitator chamber 4.

The precipitator chamber 4 is provided with any suitable means for electrical precipitation or agglomeration of the wetted suspended particles, said means consisting, for example, of a series of electrodes 10 and 11 mounted on insulators 12 and adapted to maintain an electrical field within the said chamber and to discharge electricity into the gases passing through the same in such manner as to electrically charge the suspended particles carried by said gases. Said electrodes are mounted in the chamber or flue 4 so as to extend across the chamber or flue transversely of the gas stream passing therein and are of pervious construction to permit the gases to pass successively through the electrodes.

In the embodiment shown in the drawings, these electrodes are all of such construction as to facilitate discharge of electricity, consisting, for example, of wire screens, as shown in Fig. 2, or fine wires or rods, as shown in Fig. 3, hung from frame bars 13 mounted on respective insulators 12, aforesaid, said frame bars being arranged transversely to the flow of the gases through the chamber 4, so that a set or row of discharge electrodes carried by said frame bar extends in a plane transverse to the flow of the gases, and the successive sets of such electrodes extend in planes arranged successively along the path of the gas stream. Circuit means are provided for maintaining high electrical potential, either positive or negative, on said electrodes and I prefer to so connect these electrodes to the circuit that successive sets of electrodes 10 and 11 along the flow path of the gas stream are alternately of opposite polarity and, for this purpose, circuit wires 15 and 16 leading to an electromotive source of high potential difference, either unidirectional or alternating, as preferred, are connected, respectively, to the alternate electrodes 10 and 11, as shown in Figs. 2 and 3. Baffle plates 18 and 19 are preferably provided intermediate the electrodes 10 and 11 and extending from the top and bottom of the precipitator chamber 4 to confine the gas stream so as to bring it more effectively into contact with the electrodes 10 and 11, the lower baffle plates having openings 19' through which precipitated material in liquid condition may flow along the inclined floor or bottom of the chamber 4 to an outlet 21. The condition of saturation of the gases before passing through this constricted opening should be such that the expansion at said opening, due to the difference of pressure in the chambers 6 and 4, is sufficient to cause condensation of moisture on the suspended particles, such moisture being condensed from the gases by reason of the cooling, due to such expansion.

My process may be carried out as follows:

The gas to be treated, which may consist of the effluent gases from a kiln or furnace, said gas to be at high temperature and containing solid suspended particles, pass through the flue 1, wherein it is humidified to the required extent, namely, to a condition of partial saturation, complete saturation, or supersaturation, according to the requirements of the gases. The fan or blower 2 draws the gases from the flue 1 and forces them past the spray means 7 and through the contracted or constricted opening 3 into the precipitator chamber 4. On account of the cooling by water spray means 7 and the sudden expansion on leaving said contracted opening and on account of the cooling due to contact with the walls of the flue and precipitating chamber, the humidified gases become cooled approximately to or below the dew point with the result that the solid particles suspended therein become wetted sufficiently to cohere or adhere to one another provided they can be brought into contact. In passing through the chamber 4 the suspended particles receive electric charges by the action of the electrical field and of the electrical discharge from the electrodes 10 and 11 into the gases, with the result that there is a tendency to attraction and agglomeration of the particles and on account of the wetting of the particles, as aforesaid, the particles tend to adhere to one another and to the walls of the chamber upon contact. The agglomerated particles are largely separated from the gases by gravitative action within the chamber 4; this gravitative action being rendered effective by reason of the agglomeration of the particles into comparatively large masses of a liquid or semi-liquid nature and the material gravitating to the bottom of the chamber 4, either directly or from the side walls of said chamber, flows out through the outlet 21, aforesaid. A further settling action may take place in the chamber or flue 5 through which the gases are discharged.

The extent to which the gases are humidified and the extent to which they must be cooled in order to produce the wetting of the particles required for cohesion or effective agglomeration depends on the nature of the suspended material. In the case of particles of a hygroscopic nature, such as acid fumes, it is not necessary that the temperature should be reduced to the actual dew point, provided the humidity of the gases is sufficient to enable the particles to take up moisture therefrom so as to become wet; in other cases, where there is no hygroscopic action, it is necessary to humidify and cool the gases so as to bring the same at least to the dew point.

The process above described is preferably carried out in connection with an alternating current electrical treater, for the reason that it has special advantages in connection with the use of an alternating current supply to the electrodes, as the wetting of the particles enables same to effectively cohere and agglomerate when brought into contact by the action of the alternating electrical field and to be then precipitated by gravitative action and by the action of the electrical field, without requiring rectification of the alternating current. After the agglomeration is effected the particles are susceptible (by reason of their relatively large mass) to any separating action dependent on the mass of the particles, for example, by centrifugal action or by gravitative settling action, the gases being subjected to such separating action, for example, after they leave the agglomerating chamber 4.

What I claim is:

1. The process of removing solid suspended material from gases, which consists in humidifying the gases, cooling the gases sufficiently to cause the particles to become wet by moisture condensed on the particles from the gases, and then subjecting the gases to the action of an alternating electric field to cause agglomeration and precipitation of the suspended particles.

2. In the art of separating solid suspended material from gases, the step which consists in causing the particles which are suspended in the gases to become wetted by supplying moisture thereto, and subjecting the gases containing the particles to the action of an alternating electric field to cause agglomeration and precipitation of the particles.

3. The process of removing solid suspended particles from gases, which consists in humidifying and cooling the gases to cause the particles to become wetted and then subjecting the gases to the action of successive electrical fields in such manner as to alternately discharge electricity of opposite polarity into the gases, so as to cause agglomeration and separation of the suspended particles.

4. The process of removing solid suspended particles from gases, which consists in humidifying and cooling the gases to cause the particles to become wetted and then subjecting the gases to alternating electrical field action in such manner as to alternately discharge electricity of opposite polarity into the gases, so as to cause agglomeration and separation of the suspended particles.

5. The process of separating suspended particles from gases, which consists in humidifying and cooling the gases to cause the particles to become wetted sufficiently to adhere to one another when brought into contact, then subjecting the gases to the action of an alternating electrical field to bring the particles into contact, and then separating the agglomerated masses in the gases by a mechanical separating action dependent on the mass of the particles.

6. The process of removing solid suspended material from gases, which consists in humidifying the gases and subjecting the gases to expansive action to cause condensation of moisture on the suspended particles, then subjecting the particles to the action of an electrical field to cause agglomeration of the particles and then precipitating the agglomerated particles from the gases by gravitative action.

7. An apparatus for the electrical separation of suspended particles from gases, comprising a chamber adapted to receive the gases and provided with means for humidifying the gases, a precipitator chamber communicating with the aforesaid chamber through a contracted opening to provide for expansion of the gases and discharge electrodes mounted in the precipitating chamber and provided with means for maintaining the same at sufficiently high potential to cause discharge of electricity into the gases and resultant charging and agglomerating of the suspended particles, said chamber being provided with means at the bottom portion thereof for collection and removal of the agglomerated material settling into such bottom portion of the chamber.

8. An apparatus for electrical separation of suspended particles from gases, comprising means for humidifying and cooling the gases, to condense moisture on the particles and a chamber adapted to receive the gases so treated and provided with electrodes, and with means for maintaining alternating high potential difference between said electrodes, to cause agglomeration of the particles by electrical action, said chamber being provided with means at the bottom portion thereof for collection and removal of the agglomerated material settling into such bottom portion of the chamber.

In testimony whereof I have hereunto subscribed my name this 24th day of June, 1919.

EDSON R. WOLCOTT.